United States Patent
You et al.

(10) Patent No.: US 11,419,088 B2
(45) Date of Patent: Aug. 16, 2022

(54) RADIATION SOURCE POSITIONING METHOD BASED ON RADIO SPECTRUM MONITORING BIG DATA PROCESSING

(71) Applicant: XI'AN DAHENG TIANCHENG IT CO., LTD., Xi'an (CN)

(72) Inventors: Hong You, Xi'an (CN); Hongguang Ma, Xi'an (CN)

( * ) Notice: Subject to any disclaimer, the term of this patent is extended or adjusted under 35 U.S.C. 154(b) by 135 days.

(21) Appl. No.: 16/979,036

(22) PCT Filed: Feb. 21, 2019

(86) PCT No.: PCT/CN2019/075645
§ 371 (c)(1),
(2) Date: Sep. 8, 2020

(87) PCT Pub. No.: WO2019/169999
PCT Pub. Date: Sep. 12, 2019

(65) Prior Publication Data
US 2020/0413365 A1     Dec. 31, 2020

(30) Foreign Application Priority Data
Mar. 6, 2018   (CN) .......................... 201810181437.8

(51) Int. Cl.
*H04W 16/14*   (2009.01)
*H04W 64/00*   (2009.01)
*G01S 3/14*    (2006.01)
*G01S 5/02*    (2010.01)
*G01S 5/06*    (2006.01)

(52) U.S. Cl.
CPC ............. *H04W 64/003* (2013.01); *G01S 3/14* (2013.01); *G01S 5/0278* (2013.01); *G01S 5/06* (2013.01); *H04W 16/14* (2013.01)

(58) Field of Classification Search
CPC ... H04W 64/003; H04W 16/14; G01S 5/0278; G01S 3/14
USPC ..................... 455/456.1, 456.2, 456.5, 456.6
See application file for complete search history.

(56) References Cited

U.S. PATENT DOCUMENTS 9,237,543 B2 *  1/2016  Karr ........................ G01S 1/026
9,535,155 B2 *  1/2017  Kravets ............... H04W 64/006

* cited by examiner

*Primary Examiner* — Chuck Huynh
(74) *Attorney, Agent, or Firm* — Novoclaims Patent Services LLC; Mei Lin Wong

(57) ABSTRACT

An emitter positioning method based on spectrum monitoring big data processing comprises the following steps: station monitoring data obtaining, multi-station spectrum monitoring data-based emitter direction finding, multi-station spectrum monitoring data-based emitter cross positioning, and emitter continuous positioning.

4 Claims, 2 Drawing Sheets

RADIATION SOURCE POSITIONING METHOD BASED ON RADIO SPECTRUM MONITORING BIG DATA PROCESSING

BACKGROUND OF THE PRESENT INVENTION

Field of Invention

The present invention relates to the technical field of radio spectrum monitoring data processing, and particularly relates to an emitter positioning method based on radio spectrum monitoring big data processing.

Description of Related Arts

With the development of informatics technology and the demand on spectrum monitoring, a large number of spectrum monitoring stations have been deployed, so that the networked spectrum monitoring system is formed. Since such spectrum monitoring system usually covers a large area and works in relatively high sampling speed, the quantity of data is huge in size and rich in spectrum information, therefore it is a typical case of big data. It can be said that the era of big data applying to spectrum monitoring is coming. How to utilize the spectrum monitoring data more reasonably and efficiently is a current problem that needs to be solved urgently. Emitter positioning, as important measures to geolocate the target emitter and to assist target attribute recognition, is one of important purposes of spectrum monitoring, and has great significance to national defense and battlefield construction.

Conventional emitter positioning technique is generally implemented based on a receiver with array antenna in a spectrum monitoring network. The typical positioning techniques are based on angle of arrival (AOA), time difference of arrival (TDOA), frequency difference of arrival (FDOA) and etc. Such conventional positioning techniques usually are applied to a few numbers of monitoring stations, and achieves target positioning by utilizing antenna directivity or accurate time synchronization and phase measurement.

SUMMARY OF THE PRESENT INVENTION

The present invention is different from the conventional techniques, and provides a method of emitter positioning based on the radio spectrum monitoring and big data processing. The principle is a direction finding based method which is established on the big data mining of spectrum monitoring network (SMN), i.e. this method does not rely on the antenna directivity of the single SMN receiver, and realizes the emitter positioning by the accurate geolocation of SMN nodes and the precision synchronization via their embedded GNSS models. The whole procedure does not need the personal participation and can continuously track the mobile emitters.

In order to achieve the objective above, the technical solution of the present invention is:

A method of emitter positioning based on big data mining of SMN system, which comprises the following steps:

S1: Obtaining the SMN big data based on the big data of SMN nodes covering a certain area, selecting a SMN node set $\emptyset$ that can constantly monitor the signal of a target emitter, and collecting accurate geolocations of all nodes in set $\emptyset$ and their corresponding monitoring data within the same interval, dividing the SMN node set $\emptyset$ into multiple sub-region SMN node sets $\emptyset_n$ based on a degree of geographic dispersion, where $n \geq 2$;

S2: Emitter direction finding based on multi-station spectrum monitoring data for the sub-region SMN node $\emptyset_k$, where $1 \leq k \leq n$, collect monitoring data in this set corresponding to a certain monitoring interval t of all nodes. Depending on the geolocations of SMN nodes and signal strength of emitter at SMN nodes, the direction of emitter can be determined by the signal strength descending along the geographic gradient;

S3: Emitter cross-positioning based on multi-station spectrum monitoring data repeating step S2, calculating the directions of the target emitter with respect to all the SMN node sets $\emptyset_n$, then by utilizing cross positioning method to estimate geolocation of the target emitter;

S4: Continuous positioning of target emitter repeat step S2 in the successive monitoring intervals and steps S3-S4 as well. The continuous positioning of target emitter can be realized.

In step S1, the multiple sub-region SMN node sets should be restricted by the regulations below, the sub-region SMN node set should be geographically dispersed, in this way the accuracy of the cross-positioning of target emitter can be enhanced and so does the geolocation of target emitter in subsequent steps;

It is allowed that a SMN node belonging to different sub-region SMN node sets;

the number of nodes in the sub-region SMN node sets should be as dense as possible, i.e. the more the number of SMN nodes, the higher the accuracy of the direction finding of the target emitter.

In step S2, the direction of the target signal intensity descending geographically is determined by the following method:

for all nodes in the sub-region SMN node set $\emptyset_k$, $1 \leq k \leq n$, the relationship between the target signal intensity and the geolocation of SMN node can be defined as the intensity function of the target emitter $f(p_i)$, where $p_i$ is the geolocation of node i, $f(p_i)$ can also be expressed as a ternary function $f(x_i, y_i, z_i)$, where $x_i, y_i, z_i$ are the longitude, latitude, and height of node i respectively;

the data collected in sub-region SMN node set $\emptyset_k$ can be used to calculate the gradient of signal intensity of target emitter, which can be obtained by using batch gradient descent (Batch Gradient) and other methods, and then a gradient vector $v_k$, which can reflect the position changing of target emitter, is formed.

In step S3, the geolocation of target emitter estimated by utilizing cross positioning method includes the following steps:

for all of the sub-region SMN node $\emptyset_k$, $1 \leq k \leq n$, the gradient descent vector $v_k$ of the signal intensity function of the target emitter is calculated with respect of the different positions of SMN nodes, where $1 \leq k \leq n$;

when k=2, that means there are two vector $v_k$ which can only have one intersection point p in spatial dimensions. The geolocation corresponding to p is the estimated geolocation of the target emitter, where $1 \leq k \leq 2$, when k>2, there could be multiple intersection points $p_j$, $1 \leq j \leq k$ due to the multiple gradient vectors $v_k$, take the mean value of $p = (\Sigma_{j=1}^{k} x_j, \Sigma_{j=1}^{k} y_j, \Sigma_{j=1}^{k} z_j)$ as the estimated geolocation of target emitter, where $(x_j, y_j, z_j)$ is the longitude, latitude, and height corresponding to the intersection points $p_j$.

Compared with the traditional methods of emitter positioning, the presented invention estimates the geolocation of emitter by means of the regional SMN data, i.e. the direction of emitter is firstly measured via the gradient calculation, which can be regarded as a kind of big data mining, and then the geolocation of emitter is estimated by the traditional direction finding method of line crossing. In this way the regional SMN data are efficiently utilized.

According to another aspect of the present invention, an emitter positioning method for data processing based on spectrum monitoring comprises te following steps:

S1: Obtaining station monitoring data;
  based on the big data of SMN nodes covering a certain area, selecting a SMN node set Ø that can constantly monitor the signal of a target emitter, and collecting accurate geolocations of all nodes in set Ø and their corresponding monitoring data within the same interval, dividing the SMN node set Ø into multiple sub-region SMN node sets $Ø_n$ based on a degree of geographic dispersion, where n≥2;

S2: Emitter direction finding based on multi-station spectrum monitoring data
  for the sub-region SMN node $Ø_k$, where 1≤k≤n, collect monitoring data in this set corresponding to a certain monitoring interval t of all nodes. Depending on the geolocations of SMN nodes and signal strength of emitter at SMN nodes, the direction of emitter can be determined by the signal strength descending along the geographic gradient;

Preferably, the method of the present invention further comprises the following steps:

S3: Emitter cross-positioning based on multi-station spectrum monitoring data: repeating step S2, calculating the direction of the target emitter signal corresponding to all the station sets $Ø_n$, utilizing cross positioning method to estimate the geolocation of the target emitter;

Preferably, the method of the present invention further comprises the following steps:

S4: Continuous positioning of emitter: Back to step S2, obtaining monitoring data corresponding to a successive interval, and repeating steps S2-S4 and realizing continuous positioning of the target emitter.

Preferably, in step S2, the direction in which the target signal intensity of emitter descends geographically is determined by the following method:

for all nodes in the sub-region SMN node set $Ø_k$, 1≤k≤n, the relationship between the target signal intensity and the geolocation of SMN node can be defined as the intensity function of the target emitter $f(p_i)$, where $p_i$ is the geolocation of node i, $f(p_i)$ can also be expressed as a ternary function $f(x_i, y_i, z_i)$, where $x_i, y_i, z_i$ are the longitude, latitude, and height of node i respectively; the data collected in sub-region SMN node set $Ø_k$ can be used to calculate the gradient of signal intensity of target emitter, which can be obtained by using batch gradient descent (Batch Gradient) and other methods, and then a gradient vector $v_k$, which can reflect the position changing of target emitter, is formed.

Preferably, the method of the present invention further comprises the following steps:

in step S3, utilizing cross positioning method to estimate and obtain the geolocation of the target emitter comprises the following steps of:
  for the sub-region SMN node set $Ø_k$, 1≤k≤n, calculate the gradient descent vector $v_k$ of the signal intensity function of the target emitter corresponding to each sub-region SMN node set with the different station positions respectively, where 1≤k≤n;

when k=2, the vector $v_k$ has an intersection point p in the spatial dimensions, and a geolocation corresponding to p is the estimated geolocation of the target emitter, where 1≤k≤2, when 2<k, there will be multiple intersection points $p_j$, 1≤j≤k, take the mean value $p=(\Sigma_{j=1}^{k} x_j, \Sigma_{j=1}^{k} y_j, \Sigma_{j=1}^{k} z_j)$ /k as the geolocation of target emitter, where $(x_j, y_j, z_j)$ is the longitude, latitude, and height corresponding to the intersection points $p_j$.

Compared to conventional technologies, the present invention uses massive spectrum monitoring data of multiple SMN nodes in a certain area, estimates the direction of emitter through big data mining, and finally realizes the target positioning of the emitter based on the traditional direction finding intersection positioning, which is conducive to a more reasonable and efficient use of the radio station spectrum monitoring data.

DETAILED DESCRIPTION OF THE PREFERRED EMBODIMENT

Figure 1:
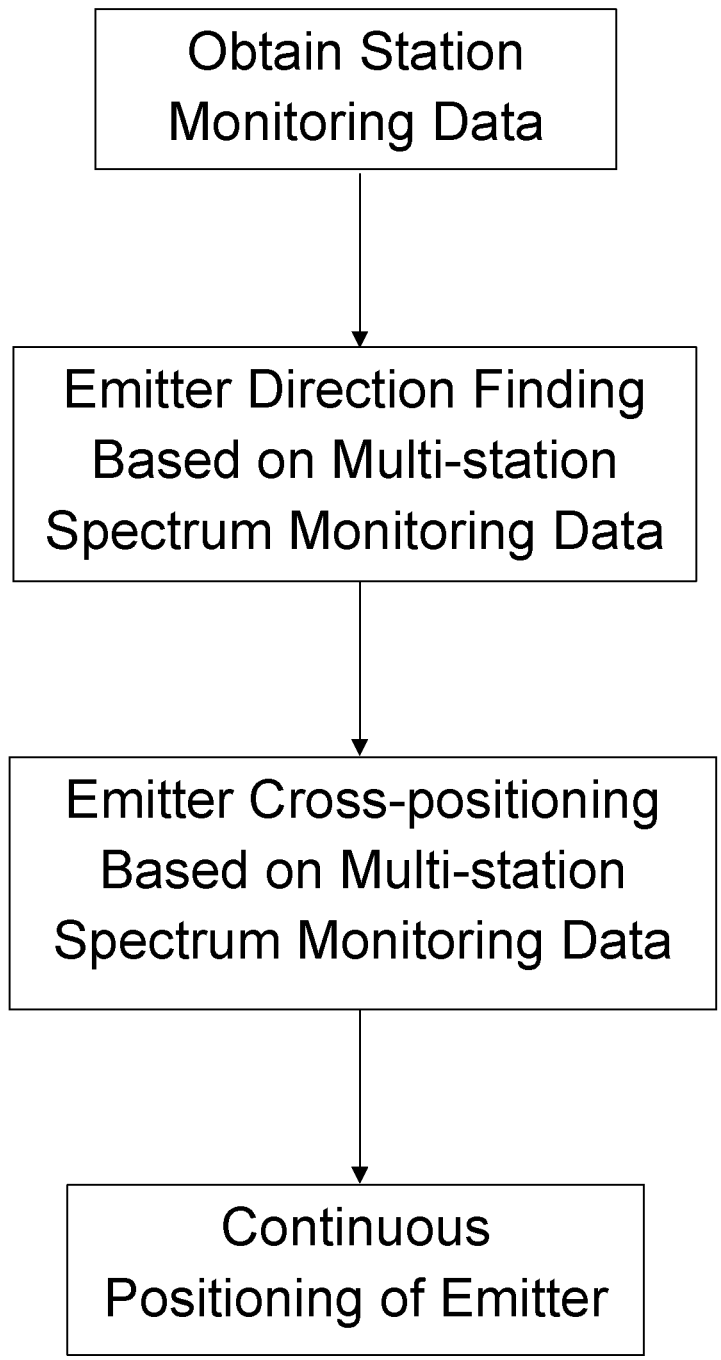
FIG. 1 is an illustration of the steps of the emitter positioning method for big data processing based on spectrum monitoring of the present invention.

In order to make the objectives, technical solutions and advantages of the embodiments of the present invention clearer, the technical solutions in the embodiments of the present invention will be described clearly and completely in conjunction with the accompanying drawings in the embodiments of the present invention. Obviously, the described embodiments are only some of the typical embodiments of the present invention, rather than all the embodiments. The components of the embodiments of the present invention generally described and shown in the drawings herein may be arranged and designed in various different configurations. Therefore, the following detailed description of the embodiments of the present invention provided in the accompanying drawings is not intended to limit the scope of the claimed invention, but merely represents selected embodiments of the present invention. Based on the embodiments of the present invention, all other embodiments obtained by those skilled in the art without inventive work shall fall within the protection scope of the present invention.

Figure 2:
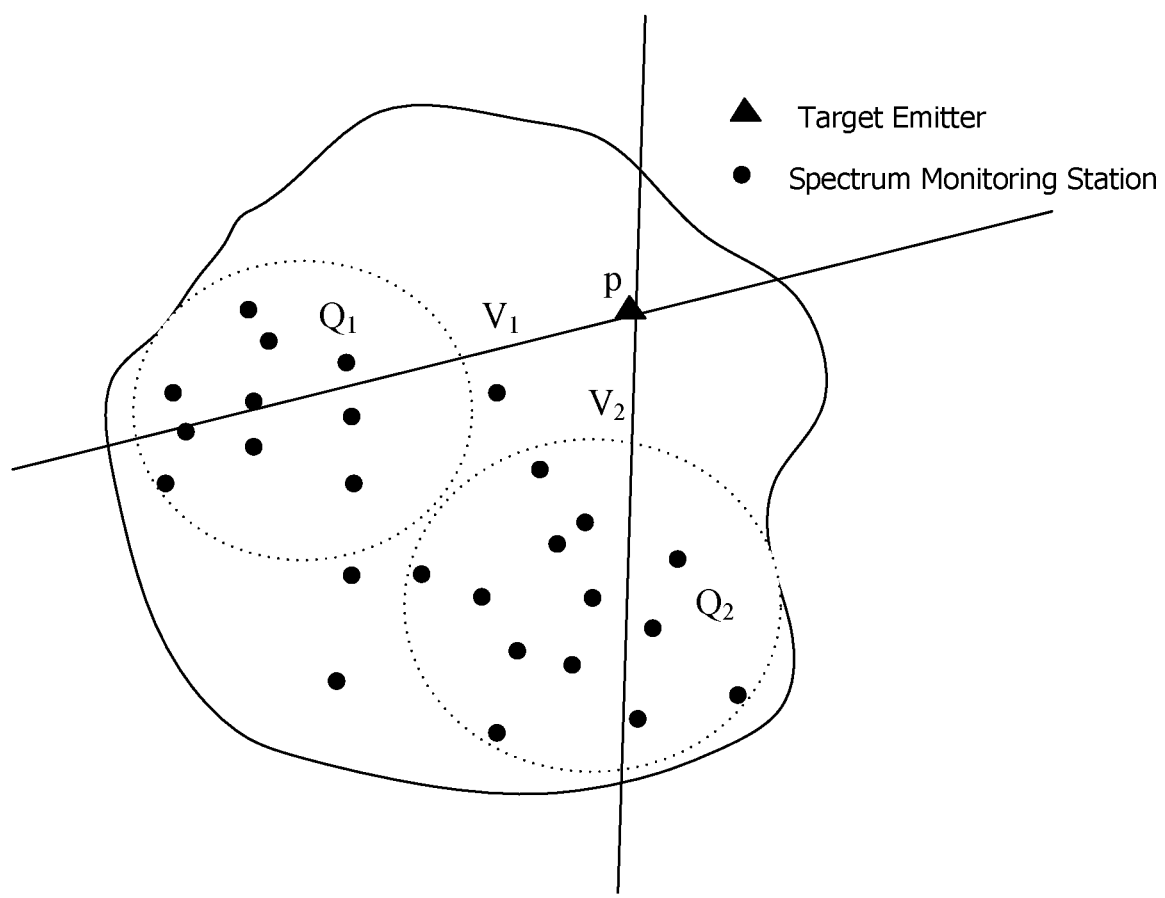
FIG. 2 is an illustration of an application scenario for the emitter positioning method for big data processing based on spectrum monitoring of the present invention.

The present invention mainly is a target emitter positioning by using the regional SMN data, which is beneficial to the more reasonable and efficient utilization of the monitoring data of multiple stations. FIG. 1 is an illustration of the steps of a positioning method of emitter for big data processing based on spectrum monitoring of the present invention. FIG. 2 is an illustration of an application scenario for the positioning method of emitter for big data processing based on spectrum monitoring of the present invention.

In the scenario as shown in FIG. 2, the position of point p is the target position of the emitter, and the black circle in the scenario is the spectrum monitoring station, and the spectrum monitoring data of all stations can be obtained. The steps by using monitoring data to automatically geolocate the target emitter are as follows:

According to the characteristics of the emitter signal, screen out the SMN node set that can monitor the signal of the target emitter, $Q=Q_1 \cup Q_2$;

Divide the SMN node set Q into two sub-region SMN node sets $\emptyset_1, \emptyset_2$, where $\emptyset_1$ contains 10 monitoring stations and $\emptyset_2$ contains 13 monitoring stations.

Take the sub-region SMN node sets $\emptyset_1, \emptyset_2$ as the training data set to calculate the gradient corresponding to the data set, the batch gradient descent method can be used to calculate the gradient descent vector $v_1, v_2$ of the signal intensity function of the target emitter corresponding to the sets $\emptyset_1, \emptyset_2$ with the different station positions;

Calculate the intersection of vectors $v_1$ and $v_2$, and obtain the intersection position p, where is the estimated position of target emitter.

Because when using the training data set to estimate the gradient, there is no requirement for the data in the training data set, so there may be some stations with the same detection data in different sub-region SMN node sets. However, the monitoring data in different sub-region SMN node sets should be as different as possible, so that the gradient descent vectors estimated by different sub-region SMN node sets will be different, and the position obtained by the cross positioning method is more accurate. Similarly, the sub-regional SMN node sets should be relatively more geographically dispersed, which is conducive to improving the accuracy of cross positioning estimation of the emitter position. In addition, when using the training data set to estimate the gradient, the stations included in the sub-region SMN node set should be as dense as possible, the larger the number, the more the accuracy of the gradient estimation, which will affect the accuracy of the estimation of the target emitter.

What is claimed is:

1. An emitter positioning method for big data processing based on spectrum monitoring, characterized in that, comprising the following steps of:

S1: Obtaining station monitoring data based on electromagnetic spectrum monitoring data of all stations in a certain area, selecting a monitoring station set Ø that can monitor a signal of a target emitter, and collecting accurate geolocation of all stations of the monitoring station set for a time interval and obtaining monitoring data of all the stations at the same time interval, dividing the monitoring station set Ø into multiple sub-region monitoring station sets $\emptyset_n$ based on a degree of geographic dispersion, where n≥2;

S2: Emitter direction finding based on multi-station spectrum monitoring data for the station set $\emptyset_k$, where 1≤k≤n, select monitoring data corresponding to a certain monitoring time interval t of all stations in the station set, according to the geolocation and signal strength of an emitter of all the stations, a direction in which the target signal strength of the emitter descends along a geographic gradient is the estimated direction of the signal of the target emitter;

S3: Emitter cross-positioning based on multi-station spectrum monitoring data repeating step S2, calculating the direction of the signal of the target emitter corresponding to all the station sets $\emptyset_n$, utilizing cross positioning method to estimate and obtain the geolocation of the target emitter;

S4: Continuous positioning of the emitter returning to step S2, obtaining monitoring data corresponding to a new time period, and repeating steps S2-S4 and realizing continuous positioning of the target emitter.

2. The emitter positioning method for big data processing based on spectrum monitoring according to claim 1, characterized in that, in the step S1, the multiple sub-region monitoring station sets meets the following regulations:

if the sub-region monitoring station set is relatively more dispersed geographically, then the accuracy of the cross-positioning method to estimate the geolocation of the emitter in a subsequent step is facilitated to improve;

allowing a station to belong to different sub-region monitoring station sets;

setting the stations in the sub-region monitoring station as dense as possible, the larger the number of stations, the better the accuracy of the estimation of the target emitter.

3. The emitter positioning method for big data processing based on spectrum monitoring according to claim 1, characterized in that, in the step S2, the direction in which the target signal intensity of the emitter descends geographically is determined by the following method:

for all the stations in the station set $\emptyset_k$, where 1≤k≤n, a relationship between the target signal intensity of the emitter and the position of the station can be defined as the signal intensity function of the target emitter $f(p_i)$, where $p_i$ is a position of a station i, $f(p_i)$ can also be expressed as a ternary function $f(x_i, y_i, z_i)$, where $x_i, y_i, z_i$ are the longitude, latitude, and height of the station i respectively;

utilizing the station set $\emptyset_k$ as a training data set to calculate a gradient corresponding to a data set, which can be obtained by using batch gradient descent (Batch Gradient) and other methods, and obtaining a gradient vector $v_k$ of the radiation intensity function of the target emitter corresponding to the station set $\emptyset_k$ as the station position changes.

4. The emitter positioning method for big data processing based on spectrum monitoring according to claim 1, characterized in that, in the step S3, utilizing cross positioning method to estimate and obtain the geolocation of the target emitter comprises the steps of:

for the station set $\emptyset_k$, 1≤k≤n, calculate the gradient descent vector $v_k$ of the signal intensity function of the target emitter corresponding to each station set as the station position changes respectively, where 1≤k≤n;

when k=2, the vector $v_k$ has an intersection point p in the space position, and a geolocation corresponding to p is the estimated geolocation of the target emitter, where 1≤k≤2, when 2<k, there will be multiple intersection points $p_j$, 1≤j≤k, take $p=(\Sigma_{j=1}^{k} x_j, \Sigma_{j=1}^{k} y_j, \Sigma_{j=1}^{k} z_j)/k$, where $(x_j, y_j, z_j)$ is the longitude, latitude, and height corresponding to the intersection points $p_j$.

* * * * *